E. PEPPLE.
Bee Hive.
No. 3,141. Patented June 24, 1843.
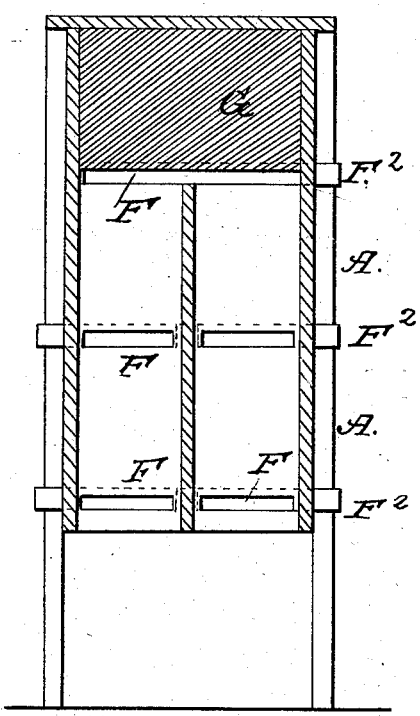
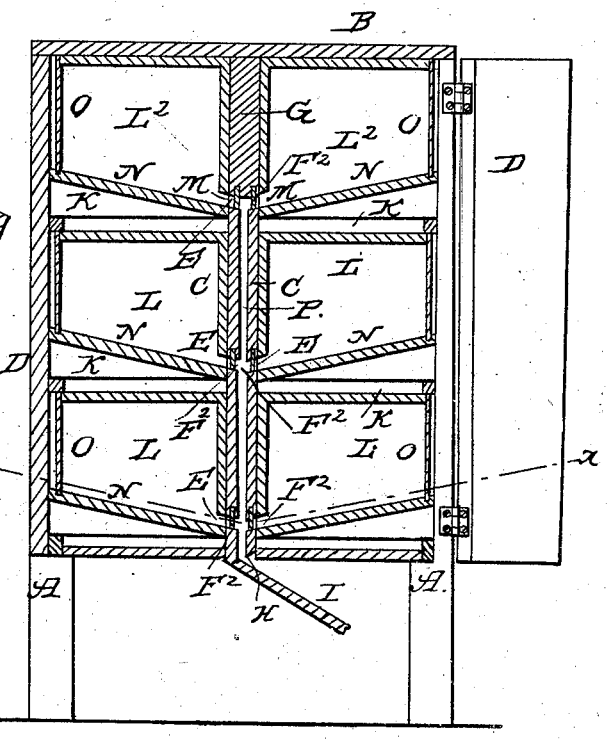
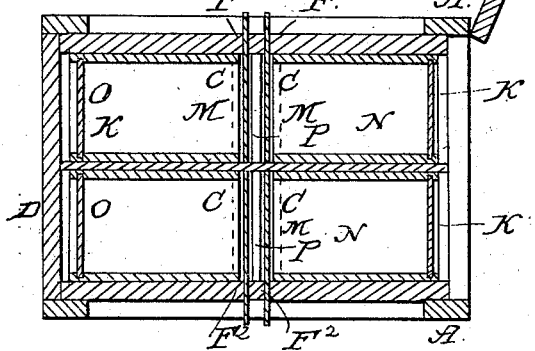

UNITED STATES PATENT OFFICE.

EDMUND PEPPLE, OF CANTON, OHIO.

BEEHIVE.

Specification of Letters Patent No. 3,141, dated June 24, 1843.

*To all whom it may concern:*

Be it known that I, EDMUND PEPPLE, of Canton, in the county of Stark and State of Ohio, have invented a new and useful Improvement in the Beehive, which is described as follows, reference being had to the annexed drawings of the same, making part of this specification.

Figure 1 is a vertical section through the center of the hive. Fig. 2 is a section at the dotted line $x\ x$ of Fig. 1. Fig. 3 is a transverse section.

This bee hive, exteriorly, resembles bee hives in use—the principal improvement being in the construction of the interior for the arrangement of the boxes and the passages for the bees to pass in and out, to and from the boxes for the deposit of the honey.

The frame A is made of a rectangular figure, of suitable size, strength, and material, closed at the sides, top and bottom, by boards B, and at the front and back by doors D hinged to the posts. In the middle of the aforesaid frame are placed two vertical parallel partitions C C about one inch apart forming a passage P of that width for the bees to ascend and descend. In these partitions are made inclined apertures F opposite each other and corresponding with similar apertures E in the boxes to be hereafter described in which the bees will enter and deposit the honey. The inclined apertures in the parallel partitions are provided with slides or valves $F^2$ for opening and closing said apertures as required in order to admit to or exclude from the boxes the bees. The parallel partitions extend to the entrances of the upper tier of boxes—from which place the partition is solid and as thick as the width of the space occupied by the parallel partitions as represented at $a$.

The bottom of the bee house is perforated in the center with an oblong aperture H corresponding with the aforesaid vertical passage P with which it communicates and to which the bees are conducted by means of an inclined board I fastened to the bottom of the hive and upon which the bees light.

The interior space of the hive is divided into several ranges of apartments corresponding in size and number with the boxes to be inserted therein, by horizontal parallel frames K secured to the interior of the hive forming ledges or ways upon which the boxes are placed and slide.

Each of the parallel partitions is of a rectangular form perforated as before described with four or more oblong apertures F through which the bees pass to and from the boxes and over which the slides or valves are brought when said apertures are to be closed arranged in a transverse vertical position about half an inch from the middle of the hive. The space between this partition and the solid one forms the entrance to the upper or large box.

The boxes L for the reception of the honey are made of a rectangular form corresponding in size and shape with the aforesaid spaces in the interior of the hive in which they are placed having an opening M in each corresponding with the openings F in the parallel partitions at which the bees enter; and also an inclined bottom N and a glass sliding door O, to view the operations of the bees, or the state of the comb; and also to discharge the honey.

The space between the top of the hive and the upper frame K is occupied with a single box on either side of the partition. All the other spaces are occupied with double the number of boxes to those just mentioned—namely four boxes between two frames K.

The upper boxes $L^2$ are in length equal to the width of the hive, inside. The other boxes, below are less than half the length of the upper boxes.

What I claim as my invention and which I desire to secure by Letters Patent is—

The arrangement of the boxes as described having an opening from each box into a common vertical central passage for the ingress and egress of the bees.

EDMUND PEPPLE.

Witnesses:
 EDMUND MAHER,
 WM. P. ELLIOT.